[12] United States Patent  (10) Patent No.: US 9,123,124 B2
Iwaki  (45) Date of Patent: Sep. 1, 2015

(54) IMAGE PROCESSING APPARATUS, IMAGE PROCESSING METHOD, AND PROGRAM

(71) Applicant: FUJIFILM Corporation, Tokyo (JP)

(72) Inventor: Yasuharu Iwaki, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/292,960

(22) Filed: Jun. 2, 2014

(65) Prior Publication Data

US 2014/0270520 A1 Sep. 18, 2014

Related U.S. Application Data

(63) Continuation of application No. PCT/JP2012/080946, filed on Nov. 29, 2012.

(30) Foreign Application Priority Data

Dec. 2, 2011 (JP) ................. 2011-264473

(51) Int. Cl.
G06K 9/00 (2006.01)
G06T 5/00 (2006.01)
H04N 5/20 (2006.01)

(52) U.S. Cl.
CPC *G06T 5/009* (2013.01); *H04N 5/20* (2013.01); *G06T 2207/10024* (2013.01); *G06T 2207/20208* (2013.01)

(58) Field of Classification Search
CPC ....... G06K 9/00; H04N 1/3935; H04N 1/407; H04N 5/20; H04N 5/225; H04N 5/232; H04N 9/07; H04N 9/45; H04N 9/67; H04N 9/68; H04N 2101/00; H04N 2209/045; G06T 3/4005; G06T 5/50; G06T 11/60
See application file for complete search history.

(56) References Cited

U.S. PATENT DOCUMENTS 7,570,390 B2 * 8/2009 Mitsunaga ............ 358/1.9
8,068,042 B2 * 11/2011 Harada et al. ........... 341/51

(Continued)

FOREIGN PATENT DOCUMENTS

JP 10-248024 9/1998
JP 2002-247364 8/2002

(Continued)

OTHER PUBLICATIONS

International Preliminary Report on Patentability (Chapter 1) PCT/JP2012/080946 in English.

(Continued)

*Primary Examiner* — Jose Couso
(74) *Attorney, Agent, or Firm* — Young & Thompson

(57) ABSTRACT

This image processing apparatus performs image processing on an image including image data with a negative value, and is provided with: a transformation unit that performs a nonlinear transformation processing on the image including image data with a negative value to transform the image into an image that does not include image data with a negative value; an image processing unit that performs predetermined image processing on the image that does not include image data with a negative value; and an inverse transformation unit that performs an inverse transformation processing of the nonlinear transformation processing on the image, having been subjected to the image processing, which does not include image data with a negative value so as to inversely transform the image into an image, having been subjected to the image processing, which includes image data with a negative value.

16 Claims, 6 Drawing Sheets

(56) References Cited

U.S. PATENT DOCUMENTS

2003/0161516 A1 8/2003 Vuylsteke
2005/0226526 A1 10/2005 Mitsunaga
2008/0291476 A1 11/2008 Higuchi

FOREIGN PATENT DOCUMENTS

| JP | 2003-283927 | 10/2003 |
| JP | 2004-221644 | 8/2004 |
| JP | 2008-289092 | 11/2008 |

OTHER PUBLICATIONS

International Search Report PCT/JP2012/080946 dated Jan. 29, 2013.
Specification S-2008-001, Academy Color Encoding Specification (ACES), The Academy of Motion Picture Arts and Sciences, Science and Technology Council, Image Interchange Framework Subcommittee, Version 1.0, Aug. 12, 2008.
Japanese Official Action—JP2011-264473—Jun. 2, 2015.

* cited by examiner

IMAGE PROCESSING APPARATUS, IMAGE PROCESSING METHOD, AND PROGRAM

CROSS-REFERENCE TO RELATED APPLICATIONS

This application is a Continuation of PCT International Application No. PCT/JP2012/80946 filed on Nov. 29, 2012, which claims priority under 35 U.S.C §119(a) to Japanese Patent Application No. 201-264473 filed Dec. 2, 2011. The above application is hereby expressly incorporated by reference, in its entirety, into the present application.

BACKGROUND OF THE PRESENT INVENTION

This invention relates to an image processing apparatus, an image processing method, and a program that performs image processing on an image having a wide dynamic range and including image data with a negative (minus) value.

Scene-referred image representations having exact color information of photographed objects and sights are used for the purpose of reproducing colors exactly and are used as a reference of a photographed image in color management. For example, in the Academy of Motion Picture Arts and Sciences (AMPAS), a scene-referred wide dynamic range image color space (ACES) is defined in color management for movie production and is used as a reference for matching colors of images photographed by various cameras. The ACES is disclosed in Specification S-2008-001, Academy Color Encoding Specification (ACES), The Academy of Motion Picture Arts and Sciences, Science and Technology Council, Image Interchange Framework Subcommittee, Version 1.0, Aug. 12, 2008 (Non-Patent Document 1).

The color space of ACES has a very wide dynamic range as described above, and image data of pixels is expressed as a floating point number. At the time of image processing such as gradation conversion or image conversion, it is necessary to deal with image data having the wide dynamic range as an input.

Methods of performing gradation conversion of an image include, for example, a method of using a computing equation, a method of using a lookup table (LUT), and the like. In the method of using a computing equation, a calculation formula becomes complex, and thus it is difficult to express arbitrary gradation characteristics.

In contrast, although an LUT is discrete, an arbitrary value can be set by the LUT. Thus, the LUT can express arbitrary characteristics and is generally and widely used. The LOT is a table in which output values corresponding to specific discrete input values are described. The LUT is classified into two types of a type A and a type B shown in the following Table 1 and Table 2, respectively. FIG. 8 is a graph showing the relationship between input values and output values of an LUT corresponding to Table 1 and Table 2.

TABLE 1

| Input Value | Output Value |
|---|---|
| −0.001 | 0.031622777 |
| 0 | 0 |
| 2.55 | 1.596871942 |
| 98.4 | 9.919677414 |
| 359 | 18.94729532 |
| 4580 | 67.67569726 |
| 11596 | 107.684725 |
| 65535 | 255.9980469 |

TABLE 2

| Input Value | Output Value |
|---|---|
| −0.001 | 0.031622777 |
| 0 | 0 |
| 0.001 | 0.031622777 |
| 0.002 | 0.04472136 |
| 0.003 | 0.054772256 |
| ... | ... |
| 6553.999 | 255.9980449 |
| 65535 | 255.9980469 |

In the LUT of the type A, as shown in Table 1, intervals between input values (set input values) which are set in the LUT are arbitrary, and an output value for an arbitrary input value is obtained by interpolation computation from two set input values with the arbitrary input value interposed therebetween (before and after the arbitrary input value).

In the LUT of the type B, as shown in Table 2, intervals between input values are equal intervals, and an output value for an arbitrary input value may be obtained by interpolation computation from two set input values with the arbitrary input value interposed therebetween in a similar manner to the type A, or an arbitrary input value may be rounded off between intervals of input values (for example, the arbitrary input value is rounded off) and an output value of a conforming set input value may be used. The LUT of the type B is generally and widely used because data reference of output value can be performed by address calculation from the input value and is very simple in either case.

In the LUT of the type B, as is understood from Table 2 described above, the number of pieces of data enormously increases in order to deal with data having a wide range. When an image having a wide dynamic range is used as a target, outdoor sunlight is equal to or greater than 10000 cd/ma, moonlight is approximately 0.01 cd/m$^2$, and a dynamic range is 6 (=$\text{Log}_{10}(10000/0.01)$). In general, since inputs of an LOT have values of steps at equal intervals, $10^6$=1000000 input values are required to cover the above dynamic range, and furthermore, there is a problem of a resolution being roughened in a dark region.

Since a human's perception of brightness has a relationship of a Log function (Weber-Fechner's Law), a method of implementing an LUT after performing Log transformation of image data having linear brightness is used. For example, an LUT having a dynamic range of 6 at intervals of $\text{Log}_{10}$=0.01 has 600 input values. In this case, since a very small number of input values of the LOT are required as compared with a case of the above-described antilogarithm, it is possible to increase resolution by increasing the number of input values to a certain degree, and thus it is possible to cover up to high brightness region while securing a resolution of a dark region.

However, the Log transformation becomes infinite in a case where an input has a value of 0 and becomes incomputable in a case where an input has a negative value, and thus image data having a negative value cannot be dealt with. In general, since image data nearly has had a positive value equal to or greater than 0 so far, there was no problem. However, in a case of scene-referred image data, it is necessary to transform image data photographed by a camera into a scene-referred color, and a negative value may be generated as a result of the computation. Although a method of simply clipping the negative value before the Log transformation is considered, an image may become unnatural and furthermore, information may be missed.

Here, JP 2004-221644 A (Patent Document 1) and JP 2003-283927 A (Patent Document 2) are the prior art relating to the present invention.

Patent Document 1 discloses an image processing apparatus that performs logarithmic transformation of brightness of an image having a wide dynamic range (DR), corrects the brightness of the image, having been subjected to the logarithmic transformation, on the basis of an LUT equivalent to a tone curve, and compresses a gradation of the image corrected using the LUT to a range of a gradation that can be displayed by a display, and then performs inverse logarithmic transformation of the brightness of the image of which the gradation is compressed to thereby output the brightness as brightness of the image of which the gradation is compressed.

Patent Document 2 discloses a method of emphasizing a contrast of a digital image by a non-linear transformation function q(x). In addition, Patent Document 2 discloses that the transformation function is expanded to q(x)=−q−x) in a negative region in order to deal with a negative value x<0. Further, Patent Document 2 discloses a combination of an exponential function term and a linear term as the transformation function q,x).

However, in Patent Document 1, it is not possible to deal with image data having a negative value. On the other hand, Patent Document 2 relates to contrast emphasis processing, and does not relate to gradation processing of an image having a wide dynamic range and also does not relate to logarithmic transformation of an image.

SUMMARY OF THE PRESENT INVENTION

A first object of the present invention is to provide an image processing apparatus, an image processing method, and a program which are capable of performing image processing on an image including image data with a negative value.

In addition to the first object, a second object of the present invention is to provide an image processing apparatus, an image processing method, and a program which are capable of performing image processing even on an image including image data with a negative value, while securing a resolution in a scale suitable for a human's perceptual capability.

In order to achieve the above object, the present invention provides an image processing apparatus configured to perform image processing on an image including image data with a negative value, the image processing apparatus comprising:

a transformation unit configured to perform a nonlinear transformation processing on the image including image data with a negative value to transform the image including image data with a negative value into an image that does not include image data with a negative value;

an image processing unit configured to perform predetermined image processing on the image that does not include image data with a negative value; and an inverse transformation unit configured to perform an inverse transformation processing of the nonlinear transformation processing on the image, having been subjected to the image processing, which does not include image data with a negative value to inversely transform the image, having been subjected to the image processing, which does not include image data with a negative value into an image, having been subjected to the image processing, which includes image data with a negative value.

Also, the present invention provides an image processing method of performing image processing on an image including image data with a negative value, the image processing method comprising steps of:

performing a nonlinear transformation processing on the image including image data with a negative value to transform the image including image data with a negative value into an image that does not include image data with a negative value;

performing predetermined image processing on the image that does not include image data with a negative value; and performing an inverse transformation processing of the nonlinear transformation processing on the image, having been subjected to the image processing, which does not include image data with a negative value to inversely transform the image, having been subjected to the image processing, which does not include image data with a negative value into an image, having been subjected to the image processing, which includes image data with a negative value.

Also, the present invention provides a non-transitory computer-readable recording medium having recorded thereon a program for causing a computer to execute the steps of the image processing method according to above.

According to the present invention, an image including image data with a negative value is transformed into an image that does not include image data with a negative value, and thus it is possible to perform image processing even on an image including image data with a negative value. In addition, according to the present invention, for example, a nonlinear transformation processing is performed on an image using functions different from each other in a case where image data has a negative value and a case where image data does not have a negative value, and thus it is possible to perform image processing on an image while securing a resolution in a scale suitable for a human's perceptual capability.

DETAILED DESCRIPTION OF THE PRESENT INVENTION

Hereinafter, an image processing apparatus, an image processing method, and a program of the present invention will be described in detail with reference to a preferred embodiment shown in the accompanying drawings.

Figure 1:
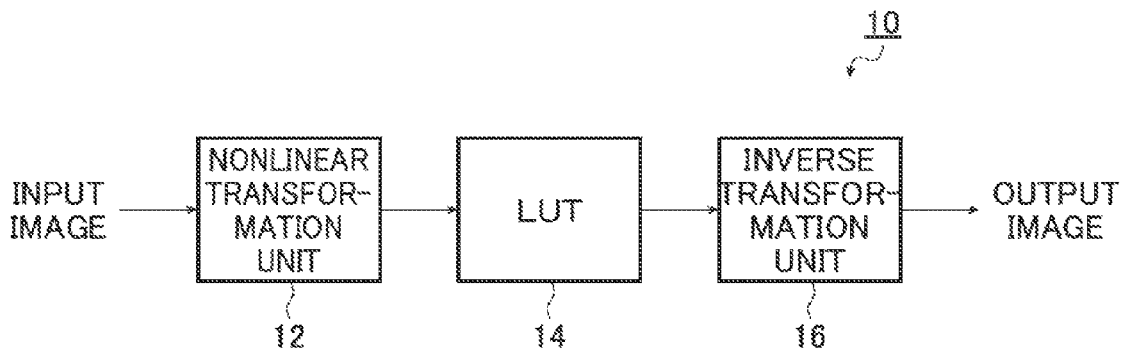
FIG. 1 is a block diagram showing the configuration of an image processing apparatus according to an embodiment of the present invention.

FIG. 1 is a block diagram showing the configuration of an image processing apparatus according to an embodiment of the present invention. An image processing apparatus 10 shown in FIG. 1 performs image processing on an image including image data with a negative value, and includes a nonlinear transformation unit 12, an LUT 14, and an inverse transformation unit 16.

The nonlinear transformation unit 12 performs a nonlinear transformation processing such as Log transformation (logarithmic transformation) or exponential transformation on an image (input image) including image data (digital image data) with a negative value to transform the image to an image that does not include image data with a negative value.

The LUT 14 is an image processing unit of the present invention, and performs predetermined image processing such as gradation conversion or image conversion on the image, transformed by the nonlinear transformation unit 12, which does not include image data with a negative value to output the image, having been subjected to the image processing, which does not include image data with a negative value.

The LUT 14 may be a one-dimensional LUT that performs one output on one input of image data, or may be a three-dimensional LUT that performs three outputs on three inputs corresponding to, for example, image data having three colors of RGB (red, green, and blue).

The inverse transformation unit 16 performs an inverse transformation processing of the nonlinear transformation processing performed by the nonlinear transformation unit 12 on the image, having been subjected to the image processing by the LUT 14, which does not include image data having a negative value, to inversely transform the image into an image (output image), having been subjected to the image processing, which includes image data with a negative value and to output the inversely-transformed image.

Figure 2:
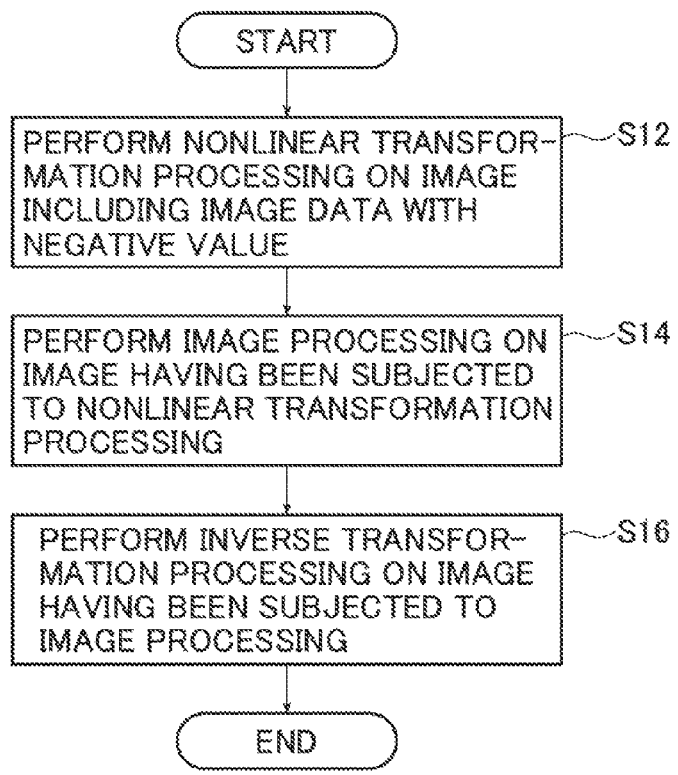
FIG. 2 is a flow chart showing the operation of the image processing apparatus shown in FIG. 1.

Subsequently, the operation of the image processing apparatus 10 will be described with reference to a flow chart shown in FIG. 2.

The image including image data with a negative value is input to the image processing apparatus 10. The image including image data with a negative value is subjected to a nonlinear transformation processing by the nonlinear transformation unit 12 to be transformed into an image that does not include image data with a negative value (step S12). The image that does not include image data with a negative value is subjected to image processing by the LUT 14 (step S14), is subjected to an inverse transformation processing of the nonlinear transformation processing by the inverse transformation unit 16 to be inversely transformed into the image, having been subjected to the image processing, which includes image data with a negative value, and is then output (step S16).

In the image processing apparatus 10, an image including image data with a negative value is transformed into an image that does not include image data with a negative value, and thus it is possible to perform image processing even on an image including image data with a negative value.

Hereinafter, the image processing apparatus 10 will be described in detail.

First, a description will be given of custom Log transformation in which a nonlinear transformation processing is performed on an image including image data with a negative value in the nonlinear transformation unit 12.

In general Log transformation, an output value (logarithm) in a case of an input value (antilogarithm) x being 0 (zero) is negative infinity, and an output value in a case of the input value x being a negative value cannot be calculated. In contrast, as an example of custom Log transformation, Log transformation is performed on the addition of a certain offset value offset to the input value x, and thus it is possible to allow computation until the input value x=−offset value offset. The following Table 3 shows an example of a case where 1 and 0.01 are added as the offset values offset to the input value x.

TABLE 3

| Input Value (antilogarithm) x | Output Value −Log10 (x + 1) | Quantization (12 bit) | Output Value −Log10 (x + 0.01) | Quantization (12 bit) |
|---|---|---|---|---|
| 1000 | −3.00043408 | 0 | −3.000004343 | 0 |
| 100 | −2.00432137 | 509 | −2.000043427 | 409 |
| 10 | −1.04139269 | 1002 | −1.000434077 | 818 |
| 1 | −0.30103 | 1381 | −0.004321374 | 1228 |
| 0.1 | −0.04139269 | 1514 | 0.958607315 | 1621 |
| 0.01 | −0.00432137 | 1533 | 1.698970004 | 1924 |
| 0.001 | −0.00043408 | 1535 | 1.958607315 | 2030 |
| 0.0001 | −4.3427E−05 | 1535 | 1.995678626 | 2045 |
| 0.00001 | −4.3429E−06 | 1535 | 1.999565923 | 2047 |
| 0 | 0 | 1535 | 2 | 2047 |
| −0.01 | 0.004364762 | 1537 | 7 | 4095 |
| −0.1 | 0.045757491 | 1559 | | |
| −0.5 | 0.301029996 | 1689 | | |
| −0.99999 | 5 | 4095 | | |

A first column (leftmost column) of Table 3 shows input values (antilogarithm) x for the nonlinear transformation unit 12, and is equivalent to a pixel value of image data. In this example, it is assumed that image data having values of −0.99999 to 1000 is input.

A second column shows computation results of custom Log transformation in a case where an offset value offset=1 is added to the input values x using a function expressed as $-\text{Log}_{10}(x+1)$. A negative sign before Log is fitted so that the computation result has the same sign as that of concentration. The computation results of the custom Log transformation are equivalent to input values of the LUT 14. Therefore, on the assumption that a 12-bit LUT is used in this example, −3 to 5 which are in an output range of the custom Log transformation are quantized and are allocated to 0 to 4095.

A third column shows input values for the LUT 14. As shown in the third column, when the input values x for the nonlinear transformation unit 12 of the first column are in a range of 0.001 to 0, all the input values for the LUT 14 of the third column are 1535. Thus, in this custom Log transformation, it is indicated that there is no resolution at an input value x for the nonlinear transformation unit 12 which is equal to or less than 0.001. Accordingly, in this custom Log transformation, it is not possible to express image data having values of 0.001 to 0 (region having a dark image and a high concentration).

A fourth column shows computation results of custom Log transformation when an offset value offset=0.01. Similarly, a fifth column shows values in a case where −3 to 7 which are in an output range of custom Log transformation are quantized and are allocated to 0 to 4095. In this case, it is assumed that image data having values of −0.01 to 1000 is input, and it is indicated that there is no resolution at an input value x which is equal to or less than 0.00001. Accordingly, in this custom Log transformation, it is not possible to express image data having values of 0.0001 to 0.

In this manner, in the custom Log transformation in which a predetermined offset value offset is added to the input value x, as the offset value offset increases, it is possible to extend a range of a processable negative value of image data. However, a resolution of an output value in the region having a dark image and a high concentration is decreased, and thus an image quality of the portion is deteriorated.

In order to solve such a problem, and to extend a range of a processable negative value of image data and to obtain an output value having a desired resolution, the nonlinear transformation unit 12 in the image processing apparatus 10 sets, for example, "0" of image data as a boundary and performs nonlinear transformation processing different from each other in a case where image data has a negative value and a case where image data does not have a negative value, using first and second functions different from each other in a case where image data has a negative value and a case where image data does not have a negative value.

Here, the first function and the second function are not limited as long as output values of both functions are continuous at the boundary. In other words, the output values of both the first and second functions being continuous at the boundary means that the output value of the first function at the boundary and the output value of the second function at the boundary are not discontinuous. Further, it is preferable that the output value of the first function at the boundary and the output value of the second function at the boundary be not apart from more than a value having a required resolution.

Hereinafter, a description will be given of a case where $(-x)^{\wedge}0.5-\text{Log}_{10}(\text{offset})$ is used as the first function when the input value x for the nonlinear transformation unit 12 is a negative value and $-\text{Log}(x+\text{offset})$ is used as the second function when the input value is not a negative value, with "0" as a boundary.

In this case, both the output values of the first and second functions at the boundary are $-\text{Log}_{10}(\text{offset})$ to conform with each other. In other words, the output values of the first and second functions are continuous. When the image data has a negative value, the image data is processed using $(-x)^{\wedge}0.5-\text{Log}_{10}(\text{offset})$, and thus it is possible to set the offset value offset to a small value to an extent that a desired resolution is obtained. Table 4 shows an example of a case where the offset value offset=0.000001.

TABLE 4

| Input Value (antilogarithm) x | Custom Log Output Value | Quantization (12 bit) |
|---|---|---|
| 1000 | −3.000000004 | 0 |
| 100 | −2.000000043 | 409 |
| 10 | −1.000000434 | 819 |
| 1 | −4.3429E-06 | 1228 |
| 0.1 | 0.999956573 | 1637 |
| 0.01 | 1.999965923 | 2047 |
| 0.001 | 2.995678626 | 2455 |
| 0.0001 | 3.958607315 | 2849 |
| 0.00001 | 4.698970004 | 3152 |
| 0 | 6 | 3685 |
| −0.01 | 6.0999995 | 3726 |
| −0.1 | 6.316227766 | 3814 |
| −0.5 | 6.707106781 | 3975 |
| −0.99999 | 6.999995 | 4095 |

As shown in this example, a nonlinear transformation processing is performed using first and second functions different from each other in a case where image data has a negative value and a case where image data does not have a negative value, and thus it is possible to deal with up to image data having a negative value of negative infinity. However, in Table 4, values which are in a range of −0.99999 to 1000 can be received, and outputs of Log transformation are allocated to integer values of 0 to 4095 of a 12-bit LUT. The results of Table 4 show that a resolution on a dark side which has a value between 0.00001 and 0 can also be secured.

Next, a description will be given of a method of creating (changing) the LUT according to the present invention from an existing LUT, in order to use custom Log transformation in which different functions are used in a case where the input value x is a negative value and a case where the input value is not a negative value.

Figure 3:
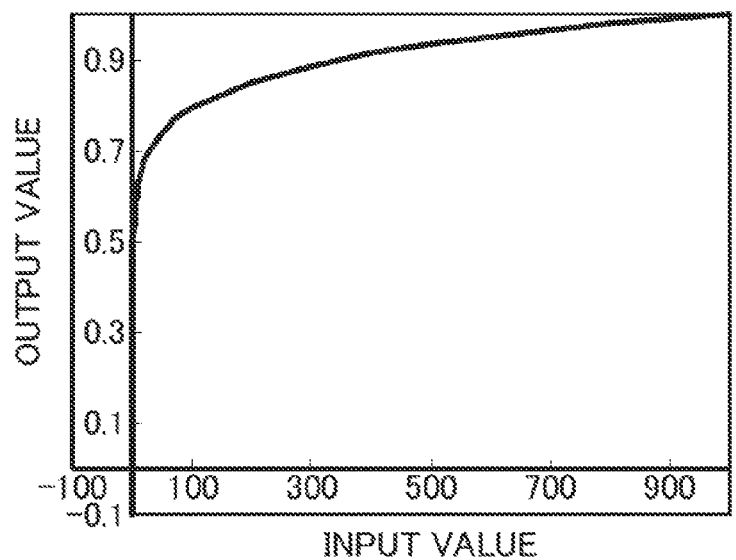
FIG. 3 is a graph showing the relationship between input values and output values of an LUT corresponding to Table 5.

It is assumed that an LUT is defined in a brightness (antilogarithm) scale in order to change gradation characteristics of an image having a wide dynamic range image and including image data with a negative value, which is defined in such a scene-referred image color space as disclosed in, for example, Non-Patent Document 1. Table 5 shows an example of an LUT for gradation conversion. As shown in a graph of FIG. 3, in the LUT for gradation conversion, when image data having a range of −1 to 1000 is input as an input value, image data having a range of −0.01 to 1 which corresponds to the input value is output as an output value.

TABLE 5

| Input Value | Output Value |
|---|---|
| −1 | −0.01 |
| −0.7 | −0.005 |
| −0.3 | −0.002 |
| 0 | 0 |
| 0.0001 | 0.008 |
| 0.0005 | 0.012 |
| ... | ... |
| ... | ... |
| 972 | 0.985 |
| 995.2 | 0.994 |
| 1000 | 1 |

Figure 4:
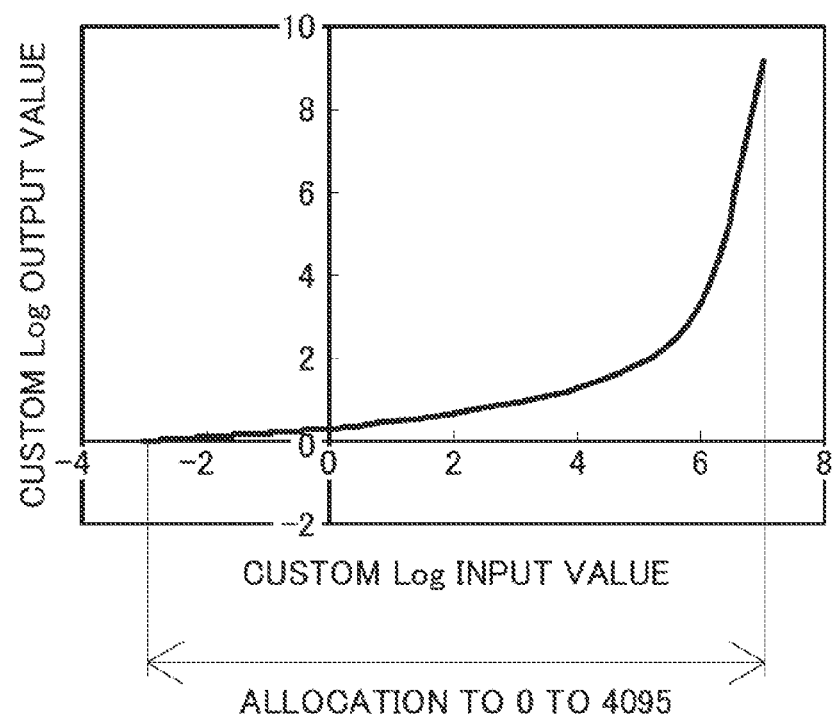
FIG. 4 is a graph showing the relationship between custom Log input values and custom Log output values of the LUT after custom Log transformation is performed on the LUT shown in FIG. 3.

In the LUT for gradation conversion shown in Table 5, required accuracy is allocated to a required region by setting input intervals to be unequal. It is considered to apply custom Log transformation so that the same processing can be performed in an LUT in which input intervals are equal intervals. In this case, both input values and output values for the LUT may be set to values having been subjected to Log transformation. Therefore, as shown in a graph of FIG. 4, Log transformation is performed on both the input values and the output values of the LUT shown in Table 5. The LUT for gradation conversion after the Log transformation is shown in Table 6.

TABLE 6

| Input Value | Output Value | Custom Log Input Value | Custom Log Output Value |
|---|---|---|---|
| −1 | −0.01 | 7 | 6.1 |
| −0.7 | −0.005 | 6.836660027 | 6.070710678 |
| −0.3 | −0.002 | 6.547722558 | 6.04472136 |
| 0 | 0 | 6 | 6 |
| 0.0001 | 0.008 | 3.958607315 | 2.096367484 |
| 0.0005 | 0.012 | 3.292429824 | 1.920456993 |
| ... | ... | ... | ... |
| ... | ... | ... | ... |
| 972 | 0.985 | −2.987666269 | 0.00655936 |
| 995.2 | 0.994 | −2.997910372 | 0.002609246 |
| 1000 | 1 | −3.000000004 | −4.34292E-06 |

A third column of Table 6 is equivalent to input values after custom Log transformation which correspond to the input values, and a fourth column is output values after custom Log transformation which correspond to the output values.

For example, when a 12-bit LUT is created, −3 to 7 (minimum value to maximum value) which are in a range of the input value after the custom Log transformation are linearly interpolated at equal intervals to be allocated to input values (integer values) of 0 to 4095 of the 12-bit LUT so as to be capable of address calculation. Since an output value can be generally expressed as a floating point number, the output value is obtained by linearly interpolating at equal intervals between two output values having been subjected to Log transformation which correspond to input values, having been subjected to Log transformation, before and after the input values allocated at equal intervals, on the basis of the custom Log output value of the fourth column of Table 6. Table 7 shows the created LUT.

TABLE 7

| Input Value | Output Value | LUT Input Value | LUT Output Value |
|---|---|---|---|
| −1 | −0.01 | 4095 | 6.1 |
| −0.7 | −0.005 | 4028 | 6.070710678 |
| −0.3 | −0.002 | 3910 | 6.0472136 |
| 0 | 0 | 3686 | 6 |
| 0.0001 | 0.008 | 2865 | 2.096367484 |
| 0.0005 | 0.012 | 2580 | 1.920456993 |
| ... | ... | ... | ... |
| ... | ... | ... | ... |
| 972 | 0.985 | 5 | 0.00655936 |
| 955.2 | 0.994 | 1 | 0.002609246 |
| 1000 | 1 | 0 | −4.34292E−06 |

Figure 5:
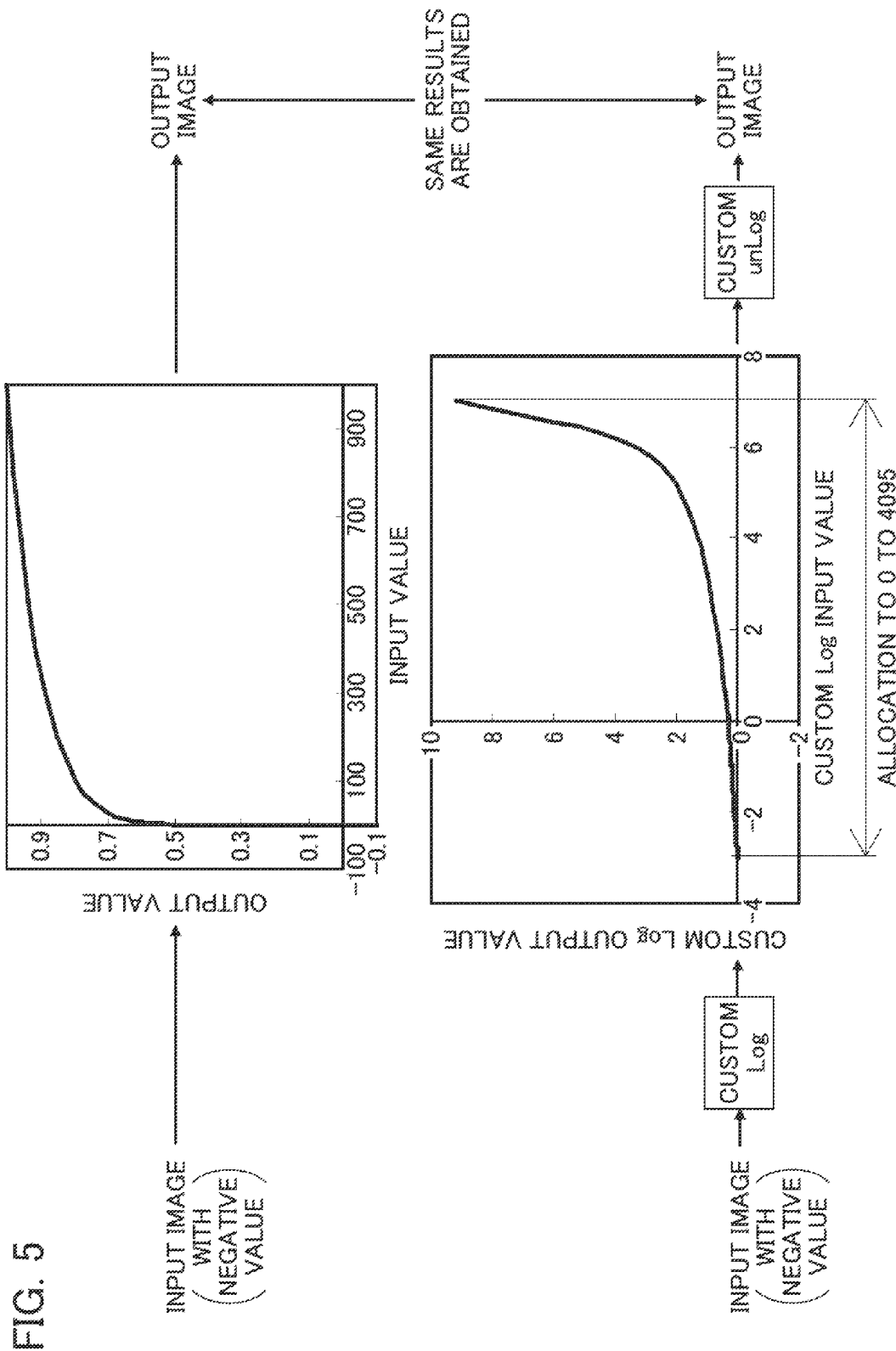
FIG. 5 is a conceptual diagram showing the state where gradation conversion is performed on an image using the LUTs shown in FIGS. 3 and 4.

FIG. 5 shows a flow of calculation for performing image processing (gradation conversion) using the LUT created in this manner and a custom Log transformation function.

First, computation of custom Log transformation is performed on input values of an image, using the following custom Log transformation function. The calculation formula of the custom Log transformation function includes calculation of allocating −3 to 7, which are in a range of an output value of the custom Log transformation, to 0 to 4095.

Custom Log transformation function $(-\mathrm{Log}_{10}(x+0.000001)+3)/(7+3)*4095); x \geq 0$ $((-x)^{\wedge}0.5-\mathrm{Log}_{10}(0.000001)+3)/(7+3)*4095; x<0$ Subsequently, output values of the custom Log transformation are input to the LUT, values of the custom Log transformation after gradation conversion are obtained from the output values of the LUT.

Finally, the output values of the LUT are returned to antilogarithm (brightness) by calculation of custom unLog transformation which is inverse transformation of the custom Log transformation, using the following custom unLog transformation function. The results are the same as results of calculation using an LOT of antilogarithm on the upper side of FIG. 5.

Custom unLog transformation function $10.0^{x}-0.000001; x<-\mathrm{Log}_{10}(0.000001)$ $(x+\mathrm{Log}_{10}(0.000001))^{2.0}; x \geq -\mathrm{Log}_{10}(0.000001)$ Thus, in an LUT in which intervals of input values are equal intervals and a resolution, not requiring an enormous size, is secured in a scale suitable for a human's perceptual capability, the same results as the LUT of antilogarithm capable of dealing with a negative value can be obtained. When calculation is performed using the LUT of antilogarithm on the upper side of FIG. 5, a table having an enormous size is required. In contrast, when calculation is performed using the custom Log transformation function, the LUT, and the custom unLog transformation functions on the lower side of FIG. 5 according to the present invention, it is possible to obtain the same calculation results, for example, using a small LUT of 12 bits in the above-described example.

Next, a resolution of Log transformation will be described.

Figure 6:
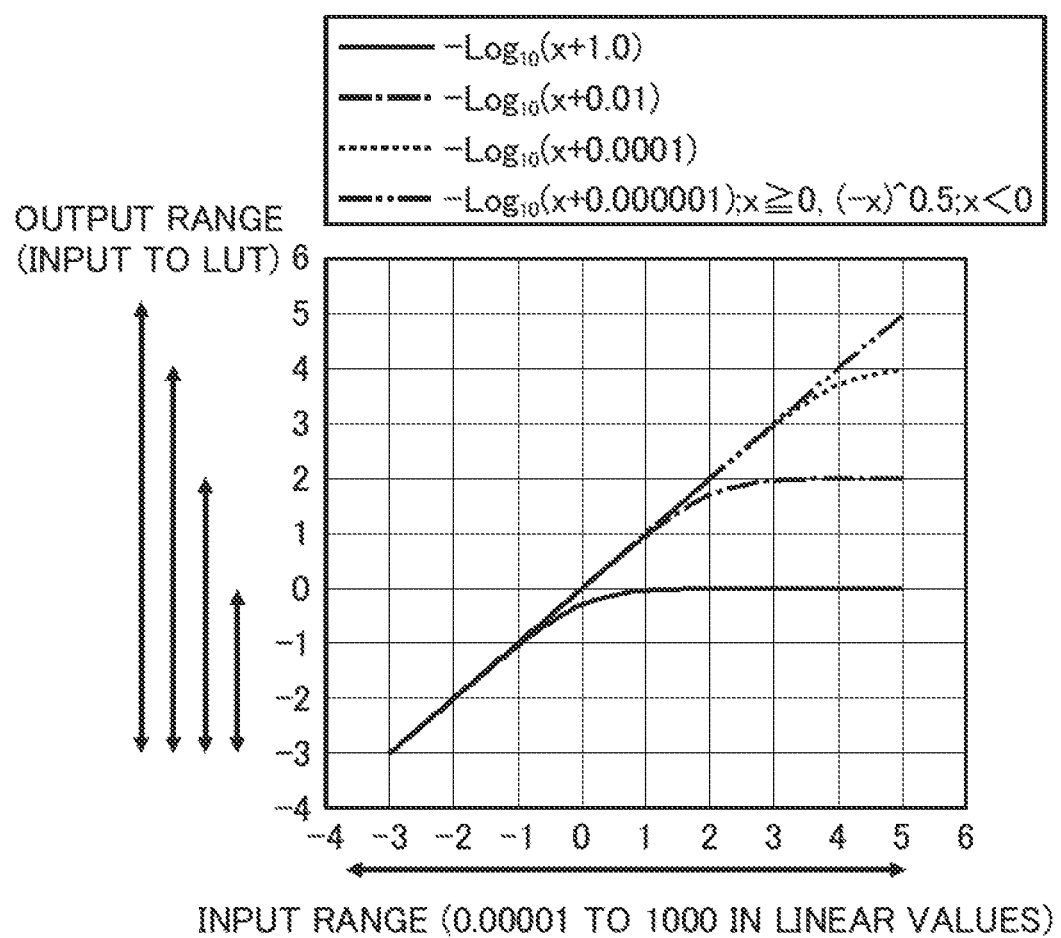
FIG. 6 is a graph showing the relationship between Log transformation values of input values and output values of custom Log transformation functions.

FIG. 6 is a graph showing the relationship between Log transformation values of input values and output values of custom Log transformation functions. In this graph, a horizontal axis represents a Log transformation value ($\mathrm{Log}_{10}(x)$) of an input value x of the custom Log transformation function, and a vertical axis represents an output value of the custom Log transformation function. This graph is obtained by setting an input range of the input value x of the custom Log transformation function to a Log transformation value having a linear value in a range of 0.00001 to 1000 which are the input values x (antilogarithm) shown in Table 3.

The graph shows output values of $-\mathrm{Log}_{10}(x+1.0)$, $-\mathrm{Log}_{10}(x+0.01)$, and $-\mathrm{Log}_{10}(x+0.0001)$ which are custom Log transformation functions to which 1.0, 0.01, and 0.0001 are added as offset values offset of the input value x and output values of $-\mathrm{Log}_{10}(x+0.00001); x \geq 0$ and $(-x)^{\wedge}0.5; x<0$ which are custom Log transformation functions having an offset value offset of 0.000001 and using different functions in a case where the input value x is a negative value and a case where the input value is not a negative value.

In a case of the custom Log transformation to which a predetermined offset value offset is added, as the offset value offset increases, a range having a processable negative value can be extended. However, as shown in this graph, an upper limit of the output value decreases. For example, art upper limit of the output value in a case where the offset value offset is 1.0 is equivalent to a case where the input value x is 0 and the relation of $-\mathrm{Log}_{10}(1.0)=0$ is established. In addition, similarly, an upper limit of the output value in a case where the offset value offset is 0.01 is equivalent to a case where the input value x is 0 and the relation of $-\mathrm{Log}_{10}(0.01)$ is established.

In this manner, in a case of the custom Log transformation to which a predetermined offset value offset is added, an upper limit of the output value, that is, a resolution is determined depending on the offset value offset. As shown in Table 3, for example, when the offset value offset is 1.0, output values where $\mathrm{Log}_{10}(x)$ is equal to or greater than 2 are set to the same value, and a resolution of the output value disappears in a case where the input value x is equal to or less than 0.01. Similarly, in a case where the offset value offset is 0.01, output values where $\mathrm{Log}_{10}(x)$ is equal to or greater than 4 are set to the same value, and a resolution of the output value disappears in a case where the input value x is equal to or less than 0.001.

In other words, in a case of the custom Log transformation to which a predetermined offset value offset is added, as the offset value offset decreases, it is possible to secure a resolution of an output value until a smaller value. Therefore, it is preferable to decrease the offset value offset in order to secure the resolution of the output value. However, in a case of the custom Log transformation to which a predetermined offset value offset is added, as the offset value offset decreases, there is an inconsistency that a range of a processable negative value is decreased.

In contrast, in a case of the custom Log transformation function using different functions in a case where an input value x is a negative value and a case where an input value x is not a negative value, an output value rises in a linear function manner with respect to an input value x, as shown in the graph of FIG. 6. For example, when a Log transformation value of the input value x increases like 1, 2, 3, 4, and 5, an output value also increases like 1, 2, 3, 4, and 5, accordingly. For this reason, even if the input value x is any value, a resolution of the output value does not disappear and can be maximally secured.

Also in a case of the custom Log transformation functions using different functions in a case where an input value x is a negative value and a case where an input value is not a negative value, as an offset value offset decreases, a resolution of an output value can be secured until a smaller value. Therefore, it is preferable to decrease the offset value offset. On the other hand, in a case where the input value x is a negative value, a function different from that in a case where the input value x is not a negative value is used, and thus it is possible to extend a range of a processable negative value. In this embodiment, a range of a processable negative value is infinite.

In other words, in a case of the custom Log transformation functions using different functions in a case where an input value x is a negative value and a case where an input value is not a negative value, an offset value offset is decreased, and thus it is possible to set a range of a processable negative value to be infinite while securing a resolution of an output value.

Next, a description will be given of the custom Log transformation functions using different functions in a case where an input value x is a negative value and a case where an input value is not a negative value.

Figure 7:
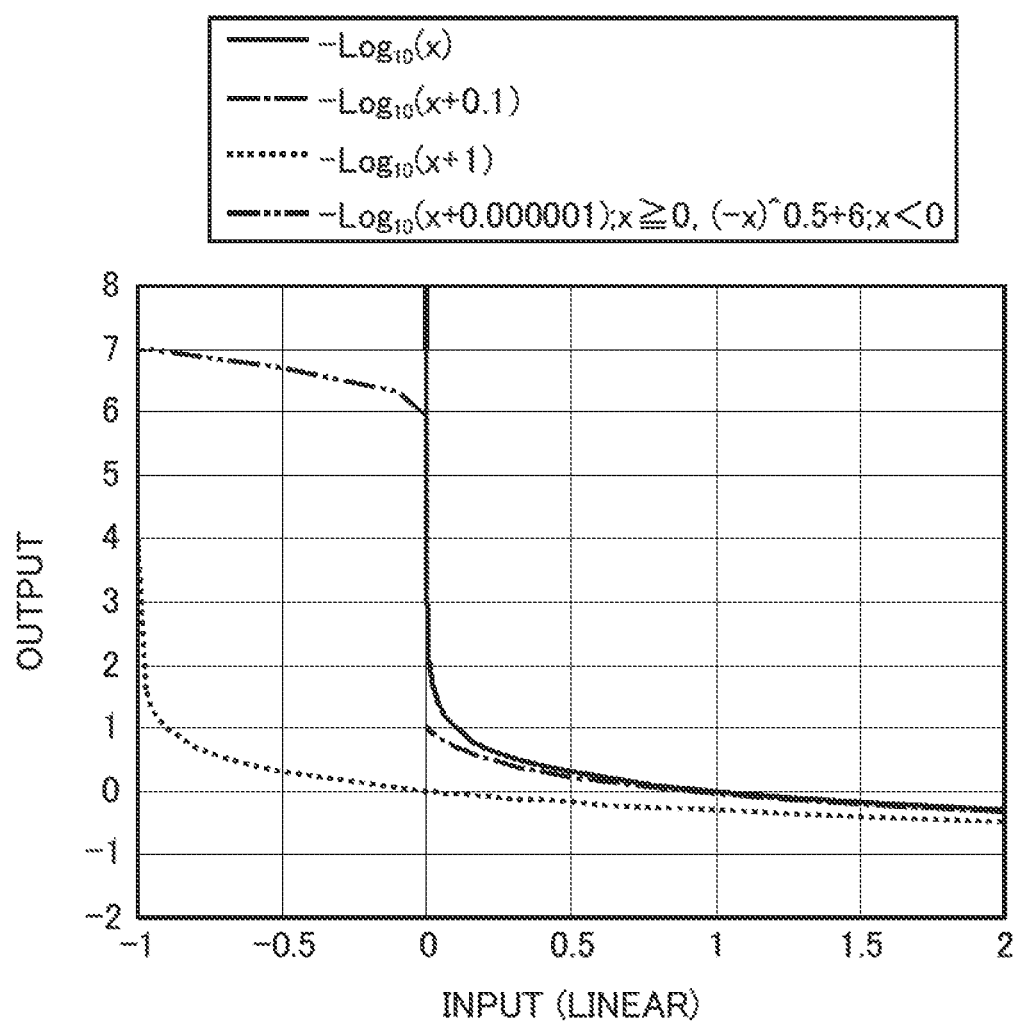
FIG. 7 is a graph showing the relationship between input values and output values of custom Log transformation functions.
Figure 8:
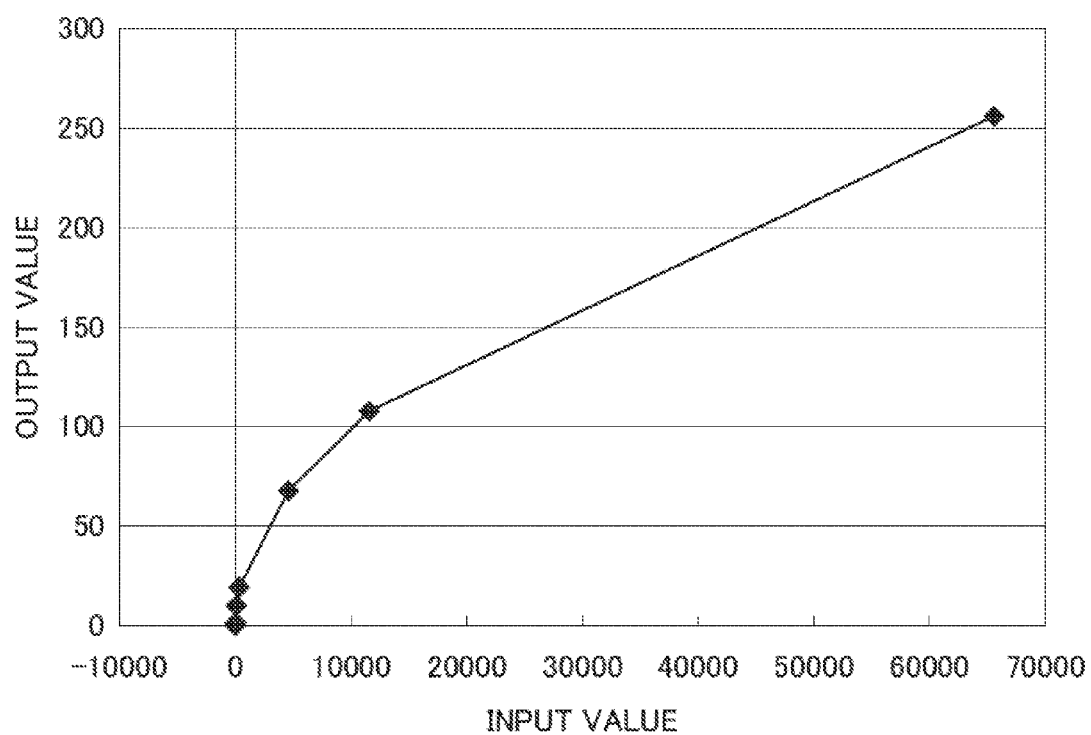
FIG. 8 is a graph showing the relationship between input values and output values of LUTs corresponding to Table 1 and Table 2.

FIG. 7 is a graph showing the relationship between input values and output values of custom Log transformation functions. In this graph, a horizontal axis represents an input value x of the custom Log transformation function, and a vertical axis represents an output value of the custom Log transformation function. In this graph, the input value x of the custom Log transformation function shows a range of −0.999999 to 2 among linear values in a range of −0.99999 to 1000 which are the input values x (antilogarithm) shown in Table 3.

The graph shows an output value of $Log_{10}(x)$ which is a Log transformation function, output values of $-Log_{10}(x+0.01)$ and $-Log_{10}(x+1.0)$ which are custom Log transformation functions to which 0.1 and 1 are added as offset values offset of the input value x, and output values of $-Log_{10}(x+30.000001)$; $x \geq 0$ and $(-x)^{0.5}+6$; $x<0$ which are custom Log transformation functions in which offset value offset is 0.000001 and different functions are used in a case where the input value x is a negative value and a case where the input value is not a negative value.

As shown in this graph, in a case of $Log_{10}(x)$ which is a Log function, a negative value of the input value x cannot be dealt with. In addition, in the cases of $-Log_{10}(x+0.1)$ and $-Log_{10}(x+1)$ which are the custom Log transformation functions, only input values x having negative values up to 0.1 and 1 can be dealt with, respectively, and a resolution of an output value is also insufficient as described above. In contrast, in the cases of $-Log_{10}(x+0.000001)$; $x \geq 0$ and $(-x)^{0.5}+6$; $x<0$ which are custom Log transformation functions, it is seen that an infinite negative value of an input value x can be dealt with and a resolution of an output value is also sufficient.

Meanwhile, in the embodiment, although the nonlinear transformation processing is performed using different functions in a case where image data has a negative value and a case where image data does not have a negative value with "0" of image data as a boundary, but the present invention is not limited thereto. A nonlinear transformation processing may be performed using first and second functions different from each other in a case where image data has a value smaller than a predetermined value and a case where image data has a value equal to or greater than the predetermined value, with the predetermined value of image data as a boundary.

In addition, as described above, the first and second functions are not limited as long as both the output values are continuous. However, for example, the first function is preferably a function in which a tilt of a change in an output value decreases as image data having a negative value decreases in a direction of negative infinity. On the other hand, for example, the second function is preferably a function in which image data not having a negative value is transformed into logarithm. In addition, an output value may be or may not be reversed so that a computation result of a function is set to the same sign as that of concentration.

In addition, an LUT is not limited to gradation conversion, and an LUT performing various image processing on an image that does not include image data with a negative value can be used. In addition, it is also possible to use a computing equation as the image processing unit of the present invention, instead of the LUT. Further, the image processing apparatus is suitable for a case where image processing is performed on an image having a wide dynamic range defined in such a scene-referred image color space as disclosed in Non-Patent Document 1. However, the present invention is not limited thereto, and the image processing apparatus can be applied to image processing of various images including image data with a negative value.

In addition, the present invention can also be realized as a program for causing a computer to execute steps of an image processing method implemented in the image processing apparatus or as a computer-readable recording medium with the program recorded thereon.

The present invention is basically configured in the above-described manner.

So far, the present invention has been described in detail, but the present invention is not limited to the above-described embodiments. Needless to say, the present invention may be improved or modified in various ways within a scope that does not depart from the gist of the present invention.

What is claimed is:

1. An image processing apparatus configured to perform image processing on an image including image data with a negative value, the image processing apparatus comprising:
   a transformation unit configured to perform a nonlinear transformation processing on the image including image data with a negative value to transform the image including image data with a negative value into an image that does not include image data with a negative value;
   an image processing unit configured to perform predetermined image processing on the image that does not include image data with a negative value; and
   an inverse transformation unit configured to perform an inverse transformation processing of the nonlinear transformation processing on the image, having been subjected to the image processing, which does not include image data with a negative value to inversely transform the image, having been subjected to the image processing, which does not include image data with a negative value into an image, having been subjected to the image processing, which includes image data with a negative value.

2. The image processing apparatus according to claim 1, wherein the transformation unit is configured to set a predetermined value of the image data as a boundary and perform the nonlinear transformation processing using first and second functions different from each other in a case where the image data is smaller than the predetermined value and a case where the image data is equal to or greater than the predetermined value, and
   wherein output values of the first and second functions are continuous at the boundary.

3. The image processing apparatus according to claim 2, wherein the predetermined value of the image data is 0, and
   wherein the transformation unit is configured to perform the nonlinear transformation processing using the first and second functions different from each other in a case where the image data has a negative value and a case where the image data does not have a negative value.

4. The image processing apparatus according to claim 3, wherein the first function is a function in which a tilt of a change in the output value decreases as the image data having a negative value decreases in a direction of negative infinity.

5. The image processing apparatus according to claim 3, wherein the second function is a function that transforms the image data not having a negative value into a logarithm.

6. The image processing apparatus according to claim 3, wherein when a value of image data of the image including the image data with a negative value is set to x and an offset value added to the x is set to offset, the first function is $(-x)^{\wedge}0.5-Log_{10}(offset)$ and the second function is $-Log_{10}(x+offset)$.

7. The image processing apparatus according to claim 1, wherein the image processing unit is configured to perform gradation conversion, as the image processing, on the image that does not include image data with a negative value.

8. The image processing apparatus according to claim 1, wherein the image processing unit is configured to perform the image processing using a lookup table.

9. The image processing apparatus according to claim 8, wherein the lookup table, which is created from an existing lookup table in which an output value corresponding to an input value is defined, is created by performing logarithmic transformation of the input value and the output value, linearly interpolating at equal intervals between a minimum value and a maximum value of the input value, having been subjected to the logarithmic transformation so as to be allocated to integer values which are in a predetermined range, and linearly interpolating at equal intervals between two logarithmically transformed output values corresponding to the logarithmically transformed input values before and after the input values allocated at equal intervals to obtain output values corresponding to the input values allocated at equal intervals.

10. The image processing apparatus according to claim 1, wherein the image processing unit is configured to perform the image processing using a computing equation.

11. The image processing apparatus according to claim 1, wherein the image processing apparatus is configured to perform image processing on an image that is defined in a scene-referred image color space.

12. An image processing method of performing image processing on an image including image data with a negative value, the image processing method comprising steps of:
 performing a nonlinear transformation processing on the image including image data with a negative value to transform the image including image data with a negative value into an image that does not include image data with a negative value;
 performing predetermined image processing on the image that does not include image data with a negative value; and
 performing an inverse transformation processing of the nonlinear transformation processing on the image, having been subjected to the image processing, which does not include image data with a negative value to inversely transform the image, having been subjected to the image processing, which does not include image data with a negative value into an image, having been subjected to the image processing, which includes image data with a negative value.

13. The image processing method according to claim 12, wherein the image processing is performed using a lookup table.

14. The image processing method according to claim 13, wherein the lookup table, which is created from an existing lookup table in which an output value corresponding to an input value is defined, is created by performing logarithmic transformation of the input value and the output value, linearly interpolating at equal intervals between a minimum value and a maximum value of the input value, having been subjected to the logarithmic transformation so as to be allocated to integer values which are in a predetermined range, and linearly interpolating at equal intervals between two logarithmically transformed output values corresponding to the logarithmically transformed input values before and after the input values allocated at equal intervals to obtain output values corresponding to the input values allocated at equal intervals.

15. The image processing method according to claim 12, wherein the image processing is performed using a computing equation.

16. A non-transitory computer-readable recording medium having recorded thereon a program for causing a computer to execute the steps of the image processing method according to claim 12.

* * * * *